Patented July 31, 1928.

1,678,719

UNITED STATES PATENT OFFICE.

GEORGE BARSKY, OF NEW YORK, N. Y., ASSIGNOR TO AMERICAN CYANAMID COMPANY, OF NEW YORK, N. Y., A CORPORATION OF MAINE.

METHOD OF MAKING ESTERS.

No Drawing. Application filed April 13, 1927. Serial No. 183,612.

This invention relates to a method of making esters of organic acids, including esters of hydroxy-acids.

I have discovered that an alcohol may be caused to react with an organic acid and a cyanogen compound of said acid, in the presence of a mineral acid, such as hydrochloric acid, and in the absence of any substantial amount of water, to form the corresponding ester. If any water is present in the reacting mixture it does not aid in the reaction but may interfere therewith, so that the presence thereof should be avoided for the best results.

The reaction as applied to the formation of ethyl oxybutyrate may be written as follows:

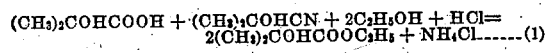

The reaction may be considered as taking place in two stages, the first of which is the interaction of the acid with the cyanhydrin as follows:

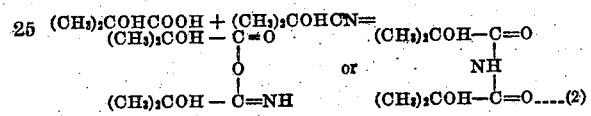

The addition product thus formed then reacts with the alcohol to give the ester in accordance with the following equation:

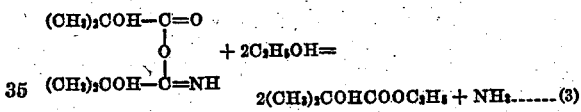

The ammonia formed in the reaction combines with the hydrochloric acid present and the ammonium chloride, being substantially insoluble in the ester, is precipitated out and may be removed by filtration.

I have found the following procedure to be suitable in carrying out my invention. I heated a mixture of one mole of oxybutyric acid and one mole of acetone cyanhydrin on a boiling water bath for one hour. The mixture was then treated with a 30% alcoholic solution of hydrochloric acid in 20% excess. The alcoholic hydrochloric acid was added over a period of one hour at a temperature of 50° C., after which the temperature was raised to 75° C., for four hours. The heating was continued for two more hours at a temperature high enough to cause refluxing to take place.

In the above run I used absolute alcohol in order to avoid the presence of water but I have found that a small amount of water, such as that present in ordinary commercial ethyl alcohol, is not unduly objectionable and I have made the ethyl ester of oxybutyric acid under such conditions. For example, I heated one mole of oxybutyric acid for one hour with two moles of 95% ethyl alcohol and 3% of hydrochloric acid. One mole of acetone cyanhydrin was added together with 1.2 moles of hydrochloric acid in 30% solution in alcohol. The mixture was heated and stirred for one hour at a temperature of 50° C. after which the temperature was raised to 70° C., and the heating continued for four hours, the temperature rising to 80° C., at the end of the run.

The excess hydrochloric acid was neutralized with dry ammonia gas, the ammonium chloride was filtered off and the solution was distilled at reduced pressure in a fractionating column. The first fraction consisted of alcohol containing 10% to 12% of ester and the second fraction consisted of 96% to 98% of ester. The residue from the distillation was treated for the production of ester as a part of the next run. By this procedure it is possible to get a yield of over 90% of theory of Equation (1).

It has been well known for a long time that esters of fatty acids can be readily produced by the interaction of a cyanhydrin and an alcohol in the presence of an acid. In this method it was necessary to add water, which was essential to the carrying out of the reaction, and the amount thereof was carefully controlled to give the desired esters. My method, on the other hand, uses no water and there is the widest difference between the same and the prior method. If water is present in the reacting ingredients it is only incidental and it plays no essential part in the reaction. However, it is permissible to have some water present, but large amounts thereof interfere greatly with the course of the reaction.

Although I have described my invention giving in detail as an example the production of ethyl oxybutyrate, the invention is not limited thereto as changes may be made in the details of the procedure without departing from the principles herein set forth. I may use other alcohols than ethyl alcohol, such as methyl, propyl, butyl and the like, and even secondary or tertiary alcohols. Other cyanhydrins may be used in place of the acetone cyanhydrin, such as lactonitrile, and I may employ organic cyanogen compounds not containing oxygen in their structures. The order in which the ingredients are added, the times and temperatures of heating, the relative amounts of the ingredients, and various other details may be changed with good results over a wide range within the invention, the scope of which is defined in the claims appended hereto.

What I claim is:

1. A method of making esters which comprises heating a mixture of an organic acid, the nitrile corresponding to said acid, and an alcohol, in the presence of a mineral acid.

2. A method of making esters which comprises heating a mixture of an organic acid, the nitrile corresponding to said acid, and an alcohol, in the absence of material amounts of water, and in the presence of a mineral acid.

3. A method of making esters which comprises heating a mixture of an organic acid, the nitrile corresponding to said acid, and an alcohol, in the presence of a mineral acid, the organic acid and the cyanhydrin being in substantially equimolecular quantities.

4. A method of making esters which comprises heating a mixture of an organic acid, the nitrile corresponding to said acid, and an alcohol, in the presence of a mineral acid, fractionally distilling the products of the reaction and treating the residue from said distillation to form additional ester.

5. A method of making ethyl oxybutyrate which comprises heating a mixture of oxybutyric acid, acetone cyanhydrin and ethyl alcohol, in the presence of a mineral acid.

6. A method of making ethyl oxybutyrate which comprises heating a mixture of oxybutyric acid, acetone cyanhydrin and ethyl alcohol, in the presence of hydrochloric acid.

7. A method of making ethyl oxybutyrate which comprises heating a mixture of oxybutyric acid, acetone cyanhydrin and ethyl alcohol, in the absence of material amounts of water, and in the presence of a mineral acid.

8. A method of making ethyl oxybutyrate which comprises heating a mixture of oxybutyric acid, acetone cyanhydrin and ethyl alcohol, in the presence of hydrochloric acid, the oxybutyric acid and the cyanhydrin being in substantially equimolecular quantities.

9. A method of making ethyl oxybutyrate which comprises heating a mixture of oxybutyric acid, acetone cyanhydrin and ethyl alcohol, in the presence of hydrochloric acid, fractionally distilling the products of the reaction and treating the residue from said distillation to form additional ethyl oxybutyrate.

In testimony whereof, I have hereunto subscribed my name this 7th day of April, 1927.

GEORGE BARSKY.